United States Patent [19] | [11] 4,234,791
Enke et al. | [45] Nov. 18, 1980

[54] TANDEM QUADRUPOLE MASS SPECTROMETER FOR SELECTED ION FRAGMENTATION STUDIES AND LOW ENERGY COLLISION INDUCED DISSOCIATOR THEREFOR

[75] Inventors: Christie G. Enke; Richard A. Yost, both of East Lansing, Mich.; James D. Morrison, Mooroolbark, Australia

[73] Assignee: Research Corporation, New York, N.Y.

[21] Appl. No.: 960,439

[22] Filed: Nov. 13, 1978

[51] Int. Cl.[2] .......... B01D 59/44

[52] U.S. Cl. .......... 250/281; 250/284; 250/296; 250/423 R

[58] Field of Search .......... 250/281, 423 R, 296, 250/284

[56] References Cited

U.S. PATENT DOCUMENTS

| | | | |
|---|---|---|---|
| 4,024,217 | 5/1977 | Wexler et al. | 250/284 |
| 4,037,100 | 7/1977 | Purser | 250/281 |

OTHER PUBLICATIONS

"Ionic Reactions in Monosilane" by Yu et al., Physical Chemistry vol. 76 Nov.-Dec. 1972 pp. 3321-3330.

"Photodissociation of $CH_3Cl+$ & $CH_3Br+$.." by Vestal et al., Chemical Physics Letters Vol. 28, No. 4, Oct. 15/74 pp. 559-561.

"Improvement of Resolution . . . " by Tuithoe Int. Jour. of Mass Spectrometry & Ion Physic Vol. 23 1977 pp. 147-151.

"Collisional Activation Mass Spectrometer . . . " by Levsen et al., Angewandte Chemie vol. 15 No. 9, Sep. 76 pp. 509-518.

"Photofragment Spectrometer" by Busch et al., Review of ScientificInstruments, vol. 44 No. 7, Jul. 1970 pp. 1066-1073.

*Primary Examiner*—Harold A. Dixon
*Attorney, Agent, or Firm*—Steven C. Schnedler

[57] ABSTRACT

A tandem quadrupole-based mass spectrometer including a highly efficient intermediate fragmentation stage. The disclosed fragmentation stage employs collision-induced dissociation (CID), in an electrodynamic focus device, which may be a quadrupole operated in a broad band filter mode. The disclosed CID process occurs at low energy (e.g., less than 1 keV, but preferably 2 eV to 100 eV), and is quite different from the high energy (e.g, greater than 1 keV, and typically 3 keV to 10 keV) CID process in prior tandem instruments such as mass-analyzed ion kinetic energy spectrometry (MIKES) systems. The efficiency of the present CID fragmentation is as high as 65%.

21 Claims, 5 Drawing Figures

CID SPECTRUM OF PURE n-HEXANE

TANDEM QUADRUPOLE MASS SPECTROMETER FOR SELECTED ION FRAGMENTATION STUDIES AND LOW ENERGY COLLISION INDUCED DISSOCIATOR THEREFOR

BACKGROUND OF THE INVENTION

The present invention relates to tandem mass spectrometers for selected ion fragmentation studies and to ion fragmentation processes for use in such spectrometers.

Selected ion fragmentation mass spectrometers have recently been developed wherein a tandem mass spectrometer is used to create ion species from a sample, select one individual ion species, fragment it such as by collision induced dissociation (CID), and obtain the mass spectrum of the fragments. This analysis has been found to be useful for such purposes as structure elucidation, mixture analysis, and determination of isotopic labeling. The following chart summarizes this analysis process:

| Sample | Ionization | Mass Sep'n | Frag-mentation | Mass Sep'n | Detection |
|---|---|---|---|---|---|
| M → | $M^+$, $Q^+$, $R^+$ → | → $M^+$<br>→ $Q^+$ →<br>→ $R^+$ | $A^+$, $B^+$, $C^+$ → | → $A^+$<br>→ $B^+$<br>→ $C^+$ | STRUCTURE DATA |
| K, M, N → | $K^+$, $M^+$, $N^+$ → | → $K^+$<br>→ $M^+$ →<br>→ $N^+$ | $M^+$, $Q^+$, $R^+$ → | → $M^+$<br>→ $Q^+$<br>→ $R^+$ | MIXTURE DATA |

Considering the above chart, in structure elucidation, the pure sample (M) is ionized by a hard ionization process such as electron impact, producing parent and fragment ions ($M^+$ and fragments $Q^+$, $R^+$). Any one of these ions (say, $Q^+$) may be selected by the first mass separation, and further fragmented to produce fragment ions ($A^+$, $B^+$, $C^+$). The resulting mass spectrum can then be obtained by scanning the second mass separation to pass one ion at a time ($A^+$, $B^+$ or $C^+$).

In mixture analysis, the multicomponent sample (components K, M, N) is subjected to soft ionization, such as provided by chemical ionization, to produce primarily the parent ion of each component ($K^+$, $M^+$, $N^+$). The first mass separation will allow one parent ion (say, $M^+$) at a time to pass into the fragmentation region where fragments or daughters are formed ($Q^+$, $R^+$). The mass spectrum can then be obtained by scanning the second mass separation to pass one ion at a time ($M^+$, $Q^+$ or $R^+$). The first stage of mass separation, then, is used to separate the components of the mixture; the second stage to obtain mass spectra of the individual components.

Heretofore, instruments used to perform these analyses have generally been of the type wherein a magnetic mass selector and an electrostatic energy selector are coupled in tandem. The energy selector produces an ion kinetic energy separation which is interpreted to provide the fragmentation mass spectrum. Such an instrument may be realized by exchanging the source and collector on most commercially available double focusing mass spectrometers. Additionally, reversed sector double focusing mass spectrometers are commercially available. Various names which have been applied to this general technique are mass-analyzed ion kinetic energy spectrometry (MIKES), direct analysis of daughter ions (DADI), and collisional activation mass spectrometry (CAMS). All of these names refer to the technique in which kinetic energy analysis in the second (electric) sector of a reversed sector double focusing mass spectrometer is used to provide data on metastable or CID ions. For convenience, all of these instruments are referred to hereinafter as "prior tandem instruments".

One goal is to develop an automated mass-spectrometry system, including a data processing unit for controlling the operating parameters of the various devices in the system and interpreting the results, in which an unknown sample may be inserted, with analysis results being printed out by the machine with a minimum of operator intervention. Such an automatic approach is illustrated generally by U.S. Pat. Nos. 4,008,388—McLafferty et al and 4,084,090—Boettger et al.

Again considering terminology, other names which may be applied to a "mass selector" as referred to above are "mass filter" and "mass analyzer". In any such device, particles are in effect separated into a spectrum according to mass or charge-to-mass ratio, and the particles comprising a particular spectral component are selected for further analysis. The selection is accomplished by an exit aperture. Rather than physically move the exit aperture to examine or scan the various spectral components, the position of the spectral distribution is varied by controlling such parameters as electric or magnetic field strength or the ion kinetic energy within the mass selector. Thus the mass selector may be viewed as a filter which passes only a particular spectral component depending on the controlled parameter. A mass scan or analysis is accomplished by varying the controlled parameter as a function of time to pass different mass spectral components, while collecting or detecting the output of the filter.

While results have been impressive with prior tandem instruments, there are a number of disadvantages. A first general disadvantage is a lack of convenient real time control. Especially in a tandem system, it is desirable to scan the mass spectra both before and after fragmentation in real time as rapidly as possible and to be able to step quickly from one mass selection to another. One primary impediment with prior tandem instruments to rapid scanning of a mass spectrum is the relatively long time required to change the magnetic field strength of the mass analyzer due to the inductive nature of the electromagnets employed. Alternatively, if scanning is accomplished by changing ion kinetic energy, processes in the CID region are affected and compensating voltage adjustments are required in the ion kinetic energy selector. Additionally, as pointed out next, it is difficult to rapidly vary the degree of fragmentation, a potentially valuable capability.

A second general disadvantage, as suggested above, relates to the fragmentation process. Two basic fragmentation processes have been used in prior tandem instruments: (1) spontaneous fragmentation of metastable ions, and (2) collision induced dissociation (CID) at relatively high ion kinetic energies above 1 keV.

The heretofore known CID process in such systems is relatively inefficient. The fragmentation efficiency is typically 10% or less. Ion losses due to scattering or other causes may be 90%, with a resultant collection efficiency of 10%. Taking the product of the fragmentation efficiency and the collection efficiency, the overall CID efficiency is then one percent or less. Efficiency may even go as low as one particle in $10^5$. One reason for this low fragmentation/collection efficiency is that with the relatively high collision energies employed, the factors favoring collision and fragmentation also increase scattering and other losses in the ion beam.

Further, as already mentioned, with both of these prior art fragmentation processes it is difficult to vary the degree of fragmentation. The degree of metastable fragmentation in prior tandem instruments can be varied only by changing that portion of the ion flight time which falls in a field free region. This can be done either by changing the length of the field free region (which requires mechanical modification) or by varying the accelerating voltage, and hence ion velocity. Varying the accelerating voltage is not easily done, however, since it requires proportional changes in the magnetic field and the electrostatic analyzer voltage.

It is also difficult to vary the degree of CID fragmentation in prior tandem instruments since the degree of fragmentation at accelerating voltages greater than approximately 1 kV is quite insensitive to changes in the collision gas pressure or the accelerating voltage.

Moreover, these first and second general disadvantages, namely the lack of fast real time control over the mass selection and the fragmentation process inefficiency together make sample size requirements higher than they might otherwise be. Similarly, they make the process more difficult to effectively automate.

A third general disadvantage with prior tandem instruments is in the area of resolution. As previously mentioned, these instruments use an electrostatic analyzer for the second stage of mass analysis. While the kinetic energy resolution of the electrostatic analyzer itself is not a limiting factor, as a consequence of using a kinetic energy analysis and interpreting the energy analysis to determine mass, the mass resolution is limited to approximately one part in 80 to one part in 300. During either collision induced dissociation (CID) or metastable dissociation, there is a kinetic energy release. This causes an energy spread in the resultant ion peaks. In addition, CID imposes an extra broadening due to energy spread caused by scattering.

This limited resolution is particularly a problem in isotopic analysis, in which unit mass resolution throughout the entire mass range is required to allow adjacent isotopic peaks to be determined. The kinetic energy broadening can be made relatively less by increasing the accelerating voltage above the usual 3–7 kV. However, accelerating voltages even in the range of 10–20 kV are quite difficult to handle instrumentally. So long as ion energy analysis is used to infer ion mass, this problem will not be solved for the prior tandem type instruments.

The first and third general disadvantages mentioned above, namely the lack of fast real time control over scanning of the mass spectra and resolution shortcomings, of the prior tandem instruments could be overcome by employing a quadrupole-type mass filter or analyzer. The particular ion mass passed by such a filter can be very rapidly changed because such devices are electrodynamic only, and do not have the large inductance of electromagnets. Therefore a mass spectrum may be very rapidly scanned. An early disclosure of such a mass filter or mass analyzer is in Paul et al U.S. Pat. No. 2,939,952. More recent descriptions may be found in G. Lawson and J. F. J. Todd, *Chem. Br.*, vol. 8, p. 373 (1972); and in the book "Quadrupole Mass Spectrometry and Its Applications," by Peter H. Dawson. While the most widely used arrangement is the basic quadrupole having exactly four electrodes, it will be appreciated that more or fewer electrodes may be employed if desired. Accordingly, the term "quadrupole-type device" as used herein is intended to cover all such devices (monopoles, octopoles, etc.) as operate on the principles as described in the above mentioned Paul et al patent, and other references.

However, despite the advantages which would accrue with the use of a quadrupole-type mass filter, direct substitution of quadrupole-type mass filters or analyzers for the analyzers in prior tandem instruments is not feasible because the electric forces employed in a quadrupole, being relatively weak compared to magnetic bending forces, are effective at ion kinetic energies up to only about 30 eV. Such low ion kinetic energies are incompatible with the relatively high ion kinetic energies needed for fragmentation by previously known CID processes, which as mentioned above, occur at energies about 1 keV.

It should be noted that certain tandem quadrupole mass spectrometers are prior art with respect to the present invention. For example, tandem quadrupole mass spectrometers for the study of ion-molecule reactions are described in the following three literature references: J. F. Futrell and T. O. Tierman in "Ion-Molecule Reactions", J. L. Franklin, Ed., Plenum Press, New York, N.Y., 1972, Chapter 11; C. R. Iden, R. Liardon, and W. S. Koski, *J. Chem. Phys.*, vol. 56, p. 851 (1972); and T. Y. Yu, M. H. Cheng, V. Kempter, and F. W. Lampe, *J. Phys. Chem.*, vol. 76, p. 3321 (1972).

In addition, and with particular relevance to the present invention, as described in the following two literature references a center RF-only quadrupole has been added to tandem quadrupole mass spectrometers for the purpose of photodissociation studies: M. L. Vestal and J. H. Futrell, *Chem. Phys. Lett.*, vol. 28, p. 559 (1954); and D. C. McGilvery and J. D. Morrison, *Int. J. Mass Spectrom. Ion Phys.*, vol. 28, pp. 81–92 (1978). Similarly, a center RF-only quadrupole has been added for metastable ion studies as described in the following literature reference: U. von Zahn and H. Tatarczyk, *Phys. Lett.*, vol. 12, p. 190 (1964).

However, despite the prior art tandem quadrupole mass spectrometer systems referred to above, prior to the present invention all of the reported selected ion fragmentation work has been performed on reversed-sector MIKES instruments. Six literature references reporting such results are: R. W. Kondrat, and R. G.

Cooks, *Anal. Chem.*, vol. 50, p. 81A (1978); T. L. Kruger, J. F. Litton, R. W. Kondrat, and R. G. Cooks, *Anal. Chem.*, vol. 48, p. 2113 (1976); H. H. Tuithof, *Int. J. Mass Spectrom. Ion Phys.*, vol. 23, p. 147 (1977); U. P. Schlunegger, *Angew. Chem., Int. Ed., Engl.*, vol. 14, p. 679 (1975); K. Levsen and H. Schwarz, *Angew. Chem., Int. Ed. Engl.*, vol. 15, p. 509 (1976); and F. W. McLafferty, P. F. Bente, III, R. Kornfield, S. C. Tsai, and I. Howe, *J. Am. Chem. Soc.*, vol. 95, p. 2120 (1973).

SUMMARY OF THE INVENTION

Accordingly, it is an object of the invention to provide more versatile and efficient methods and apparatus for selected ion fragmentation studies by mass spectrometry.

It is another object of the invention to provide more effective methods and apparatus for fragmenting molecular ions.

It is still another object of the invention to provide a mass spectrometer for selected ion fragmentation studies which is readily adaptable to computer control so as to achieve relatively automated operation.

In accordance with general aspects of the invention, a low energy collision induced dissociation (CID) process has been discovered. This process, which it is presently believed may involve direct vibrational excitation by momentum transfer, is quite different compared to the relatively high energy electronic excitation CID process observed in prior tandem instruments. Not only does the fragmentation process unexpectedly occur at low energies, but the process of the invention is extremely efficient. The fragmentation efficiency is as high as 65% in some cases, and the collection efficiency virtually 100%. The resultant 65% efficiency for the CID process of the present invention may be compared to the overall 1% or less efficiency of the previously known CID process observed in prior tandem instruments.

To more specifically characterize what is meant by "low energy" as the term is employed herein, it is generally believed that energies above 1 keV are required for the previously known electronic excitation process. Collisions of the present invention occur at energies of less than 1 keV, with 2 eV to 100 eV being typical. This particular approximate range is selected because, at energies less than approximately 2 eV the particles are too slow for focusing in the manner hereinafter described, and at energies above approximately 100 eV the particles are too fast for quadrupole mass filtering as hereinafter described.

It should be noted that the fragmentation process of the present invention is herein termed a low energy CID process both for convenience of terminology and because low energy CID fairly describes what is presently believed to be the fragmentation mode. However, this terminology is not intended to be unduly limiting, and collision-induced dissociation (CID) within the context of the present invention, and as employed in the specification and claims herein, is intended to include any fragmentation, attachment, or change of charge which is induced by the presence of collision gas molecules or atoms, whether by momentum transfer, charge transfer, ion/molecule reaction, direct electron excitation, or other process.

More specifically, the low energy CID of the present invention is performed in an electrodynamic focus device, which preferably is a quadrupole-type device. The quadrupole-type device may be operated in a broad band filter mode, for example the RF-only mode, also known as the "total-ion" mode. A collision gas, which may be argon, is introduced into the quadrupole-type device at pressures up to $2\times10^{-3}$ torr, or even higher. The focusing field serves to stablize and contain the relatively low energy fragments. Due to the low kinetic energy of the fragments, such stabilization and containment is readily accomplished.

The concept according to the invention of having CID occur within a focusing field is quite significant, along with discovery of the low energy CID process itself. The focusing is largely responsible for the extremely high (virtually 100%) collection efficiency. As a result of the efficient fragmentation process, relatively little sample is lost during the analysis, and sample sizes can accordingly be much smaller. Moreover, the focusing concept ties in quite closely with the low energy nature of the CID process itself because it would be difficult, if not impossible, to contain high energy collisions of the type observed in prior tandem instruments within focusing devices of the type preferably employed in the practice of the present invention.

Concerning fragmentation stage focusing, in the presently preferred embodiments of the invention, this focusing is conveniently accomplished within a quadrupole-type device, although it is possible that other focusing devices, both electrodynamic and otherwise, may be suitable. While, in the presently preferred embodiments the fragmentation quadrupole is operated in a broad band filter mode, specifically the RF-only mode, varying degrees of mass filtering may be introduced in the fragmentation quadrupole, such as by adding DC bias, without departing from the invention.

Briefly stated and in accordance with another aspect of the invention, quadrupole based mass spectrometers are provided which employ the present low energy CID process. The low energy CID process is fully compatible with quadrupole mass filters, resulting in an overall quadrupole based system with all of the well known advantages of the quadrupole such as low cost, high efficiency, and control versatility.

While the low energy CID process of the present invention is most advantageously employed in combination with a quadrupole mass filter, as noted above other types of mass filters or analyzers may be employed as well. To the extent that the ion axial kinetic energies required for proper operation of the various devices of a mixed system are incompatible, known electrostatic lenses may be employed to slow down and speed up the ions as required. Therefore, in accordance with another aspect of the invention, a selected ion mass spectrometer is provided comprising first and second mass analyzers in tandem, with a means for directing ionized sample molecules into the first mass analyzer. A low energy collision induced dissociation fragmentation stage is interposed between the mass analyzers for receiving selected ionized sample molecules from the first mass analyzer, for fragmenting the selected ionized sample molecules into ionized fragments, for collecting the ionized fragments, and for directing the ionized fragments into the second mass analyzer. Specifically, the fragmentation stage includes a collision gas containing electrodynamic focus device, preferably a quadrupole-type device operated in any broad band filter mode. Finally, a detector is responsive to the output of the second mass analyzer.

Briefly stated and in accordance with another aspect of the invention, there is provided a method for studying the fragmentation of selected molecular parent ions, which method includes the steps of directing selected ionized parent ions at relatively low ion kinetic energies into an electrodynamic focus device, preferably a quadrupole type device operated in a broad band filter mode and having a collision gas introduced therein, daughter ions being produced as a result of collisions between the parent ions in the atoms or molecules of the collision gas; and analyzing the daughter ions.

Briefly stated and in accordance with still another aspect of the invention, there is provided a highly efficient arrangement for fragmenting molecular ions by collision induced dissociation and collecting the resultant fragments. The arrangement includes an electrodynamic focus device, preferably a quadrupole-type device operated in a broad band filter mode, a collision gas introduced into one end of the electrodynamic focus device, and means for injecting molecular ions at relatively low ion kinetic energies into one end of the quadrupole-type device. As a result of collisions of the injected molecular ions with the atoms or molecules of the collision gas, fragments of the injected molecular ions are produced. These fragment ions are coaxially confined within the quadrupole-type device by the strong focusing field therein, and exit from the other end of the quadrupole-type device. The means for injecting molecular ions injects molecular ions into the quadrupole-type device at ion axial kinetic energies of less than 1 keV, and preferably 2 eV to 100 eV.

In accordance with still another aspect of the invention, there is provided a highly efficient method of fragmenting molecular ions, which method includes the steps of directing ionized parent ions at relatively low ion kinetic energies into a quadrupole-type device operated in substantially an RF-only mode and having a collision gas introduced therein. The parent ions are directed into the quadrupole-type device at ionic kinetic energies of less than 1 keV, and preferably 2 eV to 100 eV.

The present invention therefore provides a new, low energy, highly efficient CID process, as well as greatly improved tandem mass spectrometer for selected ion fragmentation studies. Not only is the versatility and adjustability of the spectrometer greatly improved, but as a result of the rapid scanning or stepping of the mass spectra and the highly efficient CID process, the sample sizes may be much smaller than heretofore employed.

A number of other advantages also accrue, some of which will be more apparent from the "Description of the Preferred Embodiments," below. Concerning the construction of apparatus for the practice of the invention, the invention permits apparatus of relatively small size, possibly even portable or mobile and having relatively low power requirements to be constructed. Additionally, compatible fabrication technology may be used throughout where, in accordance with the preferred embodiments, three quadrupole-type devices are employed. Concerning the type of analysis, since the inventive CID process is not limited to the use of hydrogen as the collison gas, an additional dimension or variable is available for use as an analysis tool, namely, varying the collision gas. Accordingly, it is within the scope of the invention to specifically choose the collision gas to enhance particular features of the fragmentation process.

It should be noted that aspects of the present invention have been disclosed in literature published less than one year prior to the filing date hereof. Specifically, R. A. Yost, C. G. Enke, *J. Am. Chem. Soc.*, vol. 100, pp. 2274–2275, (1978). This single citation should not, however, be taken as implying that other acts of publication less than one year prior to the filing date hereof have not occurred.

BRIEF DESCRIPTION OF THE DRAWINGS

While the novel features of the invention are set forth with particularity in the appended claims, the invention, both as to organization and contents, will be better understood and appreciated, along with other objects and features thereof, from the following detailed description taken in conjunction with the drawings, in which:

DESCRIPTION OF THE PREFERRED EMBODIMENTS

Figure 1:
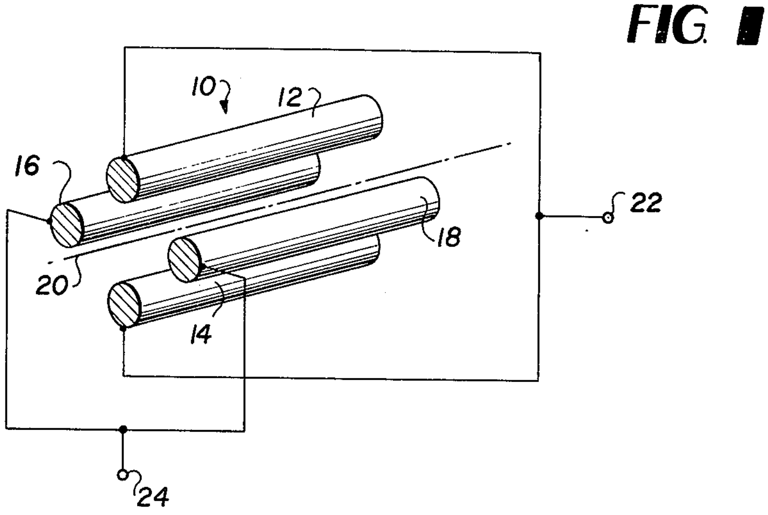
FIG. 1 is a highly schematic perspective view of a guadrupole device.

Referring first to FIG. 1, there is shown in highly schematic form a quadrupole 10 representative of the quadrupoles employed in the present system. The quadrupole 10 is of the well known type such as is described in the above mentioned Paul et al U.S. Pat. No. 2,939,952. The quadrupole 10 comprises four circularly cylindrical electrodes 12, 14, 16 and 18 arranged about a central axis 20. For clarity of illustration, the supporting structure as well as the vacuum enclosure are omitted from FIG. 1.

As is conventional, opposite pairs of electrodes are interconnected and brought out to terminals 22 and 24. Specifically, opposed electrodes 12 and 14 are both electrically connected to the terminal 22, and opposed electrodes 16 and 18 are both electrically connected to the terminal 24.

In the operation of the quadrupole 10, as described by Paul et al, superimposed RF and DC voltages are applied across the terminals 22 and 24 and a stream of ions is directed along the axis 20. Depending upon the particular RF and DC potentials applied, only ions of selected charge to mass ratio pass through the quadrupole 10, with the remaining ions following unstable trajectories leading to escape from the quadrupole field. These remaining ions impact on the quadrupole rods or case and are neutralized.

As is further described by Paul et al, if only an RF voltage is applied across the terminals 22 and 24, without a DC component, the range of ion masses which have stable trajectories passing through the quadrupole 10 is quite broad to the extent that effective mass filtering does not result. Accordingly, this is known as the "total ion" mode of quadrupole operation.

Figure 2:
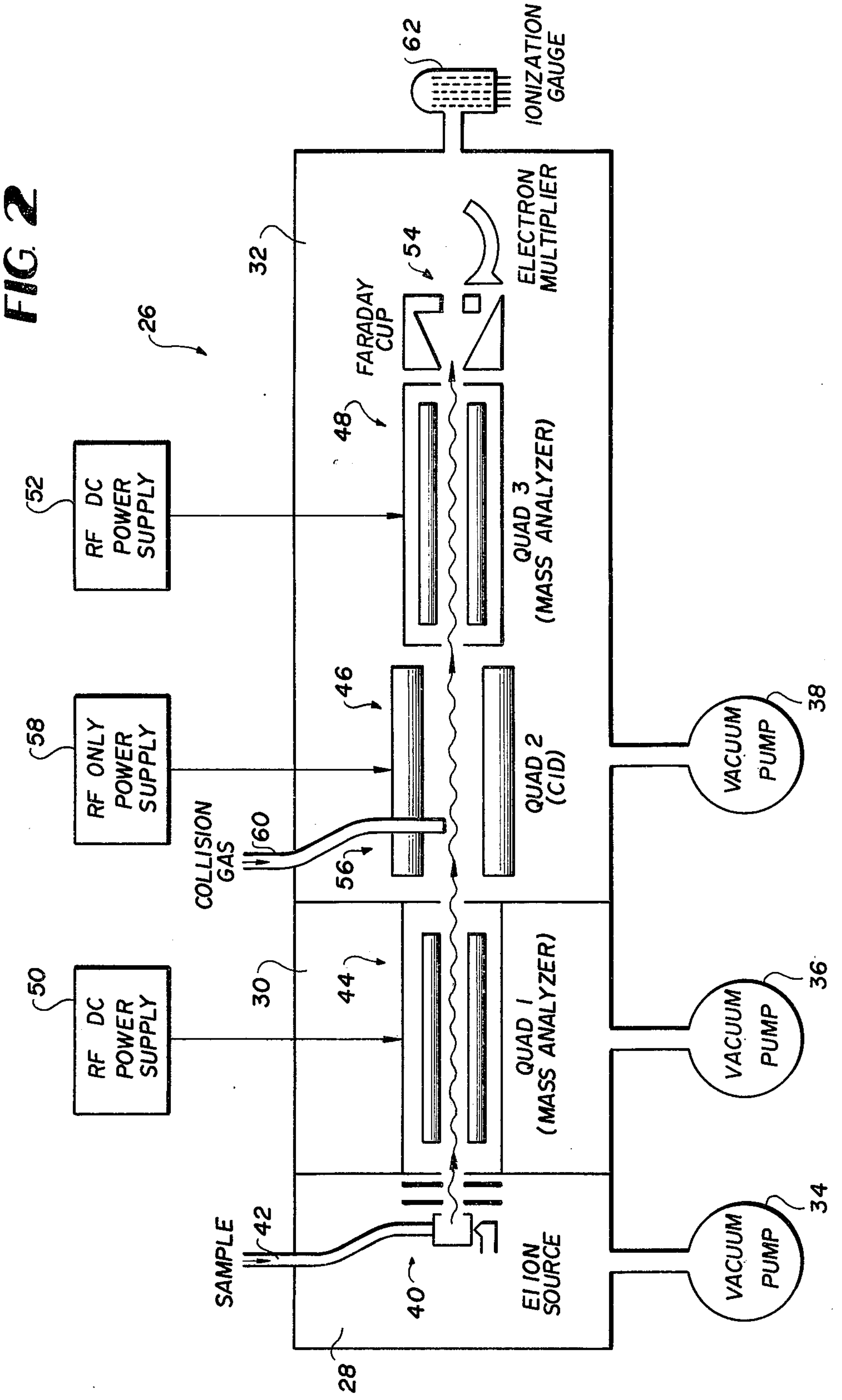
FIG. 2 is a schematic representation of a tandem quadrupole mass spectrometer for selected ion fragmentation in accordance with the present invention.

Turning now to FIG. 2, a tandem quadrupole mass spectrometer 26 for selected ion fragmentation studies including three quadrupole devices is illustrated in highly schematic form. The spectrometer 26 comprises three physically separate sections 28, 30 and 32 evacuated by separate vacuum pumps 34, 36 and 38, respectively. Within the left-hand section 28 there is disposed an electron impact (EI) ion source 40 of conventional configuration. Sample molecules are introduced via a tube 42 representative of an unheated batch inlet system and are ionized in the EI ion source typically by 70 eV electrons.

The spectrometer 26 also includes three electrodynamic focus devices, 44, 46 and 48, which are preferably quadrupoles. The first quadrupole 44 is disposed within the middle section 30, and the second and third quadrupoles 46 and 48 are disposed within the right-hand section 32.

The first and third quadrupoles 44 and 48 are operated respectively from power supplies 50 and 52 which generate superimposed RF and DC voltages so as to operate the quadrupoles 44 and 48 in their mass selection mode. Accordingly, the first and third quadrupoles 44 and 48 are also termed first and second quadrupole-type mass analyzers, respectively, herein.

Also within the right-hand section 32 is a detector, generally designated 54, responsive to the output of the second quadrupole type mass analyzer comprising the third quadrupole 48. The detector 54 may be any suitable type, and in the illustrated embodiment comprises a Faraday cup followed by an electron multiplier.

The mass spectrometer 26 also includes a low energy collision induced dissociation fragmentation stage, generally designated 56, arranged to receive the selected ionized sample molecules from the first quadrupole-type mass analyzer comprising the quadrupole 44 and producing ionized fragments of the selected ionized sample molecules which are directed into the second quadrupole-type mass analyzer comprising the quadrupole 48. In the illustrated embodiment, the fragmentation stage 56 comprises the second quadrupole-type device 46, the quadrupole 46 being operated in substantially an RF-only mode by a power supply 58. It will be appreciated however, that any suitable electrodynamic focus device may be employed to contain and direct the collision fragments. A collision gas, which may be hydrogen or argon, is introduced into the CID quadrupole 46 through a representative tube 60. However, this should not be taken as a limitation on collision gases which may be employed. Moreover, as previously mentioned in the "Summary of the Invention," varying the collision gas provides another variable for use in analysis. Further, the collision gas may be specifically chosen to enhance particular features of the collision process. An ionization gauge 62 is connected to the section 32 to measure the collision gas pressure.

The CID quadrupole 46 comprises four rods having diameters of 1.9 centimeters, and lengths of 15 centimeters. The quadrupole 46 is operated at a frequency of 2.8 MHz, over a range of 0 to 1 kV peak RF. Collision gas pressures up to $2\times10^{-4}$ torr are employed, this upper limit being imposed by the lack of differential pumping between the CID region and the electron multiplier, since, in the particular experimental apparatus employed, both of these stations are within the same section 32 and share a common vacuum pump 38.

At this point, it should be emphasized that the $2\times10^{-4}$ torr collision gas pressure is a limitation of the particular apparatus from which the experimental data hereinafter presented were obtained. It is expected that collision gas pressures up to $2\times10^{-3}$ torr will routinely be employed, there being no particular significance even to this number insofar as regards the concepts of the invention. It is believed that upper limits will be found to exist as a practical matter, depending upon the particular apparatus, on account of such factors as excessive differential pressures between sections leading to leaking and contamination of the other devices, such as the electron multiplier, which to avoid arcing in view of the high voltage employed require a high vacuum; arcing due to RF voltages in the CID quadrupole itself (which could be minimized by reducing the RF voltage); and, eventually, scattering losses as more and more collisions occur.

The first and third quadrupoles 44 and 48 operated as the first and second mass analyzers comprise four 0.79 centimeter rods, each 20 centimeters long. The first and second mass analyzers are tuned to provide unit mass resolution over the entire mass range of 0 to 100 atomic mass units (amu).

In accordance with the invention, the fragmentation stage 56 is a low energy fragmentation stage, and a low energy CID process occurs therein. Ions are introduced into the fragmentation stage 56 at relatively low ion axial kinetic energies in the order of 5 to 20 eV.

The foregoing description with reference to FIG. 2 is based primarily on the first experimental apparatus constructed in the development of this invention. A second, improved, experimental apparatus has recently been constructed which has certain constructional features which are preferable to those of the first experimental apparatus. In its essentials, however, the second experimental apparatus is unchanged.

The second experimental apparatus has two constructional aspects which are intended to minimize contamination of other elements of the apparatus, particularly the high voltage electron multiplier, by the collision gas. First, the QUAD 1 and the QUAD 2 (CID) regions share one vacuum pump, while the QUAD 3 region and the electron multiplier share another vacuum pump. Second, QUAD 2 (CID) is enclosed within a suitable can, within the region evacuated by the one vacuum pump, with beam-passing apertures at the entry and exit ends thereof. The first experimental apparatus, as represented in FIG. 2, was not so constructed because it was originally intended for use in photodissociation studies where no collision gas is introduced, and merely adapted for the practice of the present invention.

Additional changes in the second experimental apparatus, which are not believed particularly significant as regards the essential concepts of the invention are that all three quadrupoles are of the same size; both chemical ionization and electron impact (EI) ion sources are included for alternative use; and an electron multiplier is employed alone as the detector, without a Faraday cup.

As an aid to understanding the low energy CID process according to the invention, the results of a digital simulation of ion trajectories in an RF-only quadrupole are described below, followed by a description and discussion of actual experimental data obtained from operation of the spectrometer 26.

Simulation

Briefly, a program for digitally simulating ion trajectories in an RF-only quadrupole has been developed. By way of disclaimer, it should be noted that this simulation program was developed by others, and forms no part of the present invention. It was employed, as described below, merely to gain additional insight concerning the invention. The particular simulation employed assumes round quadrupole electrode rods, and a point by point description of the field within the quadrupole. Fringing fields are ignored. An ion may be "injected" into the field and its motion traced. The trajectories are observed to resemble ellipses centered around the quadrupole axis.

Simulations covered the range from 1 kHz to 20 MHz, 10 to 1000 volts peak RF, 1 to 2 centimeter rods, and ions of mass 5 to 600. As a result of these simulations, approximate empirical expressions which describe the ion motion were obtained, and appear below in Table I:

TABLE I

Empirical Expressions Describing Simulated Ion Trajectories in RF-Only Quadrupoles

| | | |
|---|---|---|
| orbit period | $\tau = \frac{6 \times 10^{-6}\,\mathrm{mfd}^2}{V}$ | (sec) |
| orbit length | $l = \frac{5 \times 10^{-2}\sqrt{m/E}\,\mathrm{fd}^2}{V}$ | (m) |
| average velocity | $\bar{v} = \frac{1}{\tau} = 9 \times 10^3\sqrt{E/m}$ | (m/sec) |
| lower mass limit | $M_{min} = \frac{0.5\,V}{f^2d^2}$ | |
| upper mass limit | $M_{max} = \frac{2 \times 10^{-2}\,V^{5/2}}{f^2d^2E}$ | (amu) |

V = peak RF voltage (V)
f = RF frequency (MHz)
E = off-axis energy (eV)
m = ion mass (amu)
d = pole diameter (cm)

From Table I it can be seen the expressions obtained include the period and path lengths of the generally elliptical orbits (and hence average velocity), as well as the upper and lower mass limits. It is significant that the ion average transverse velocity (and hence the path length through the quadrupole and the transverse kinetic energy) is independent of the RF voltage and frequency. Based on this simulation, neither RF parameter should substantially affect the CID process, and this has been experimentally verified. Experimentally, the orbit period appears to obey the relationship $$\tau = \frac{7 \times 10^{-6}\,mfd^2}{V},$$

a result which is quite close to the expression for the simulated behavior.

CID Efficiency

As previously mentioned, the efficiency of the low energy CID process of the present invention is quite high. To determine fragmentation and collection efficiency, we let $P_o$ and P represent the parent ion beam current at the entrance and exit of the CID region respectively, and $\Sigma F_i$ the total current of all fragment ions at the exit of the CID region. The fragmentation efficiency is $$E_F = \frac{\Sigma F_i}{P + \Sigma F_i},$$

the collection efficiency is $$E_c = \frac{P + \Sigma F_i}{P_o},$$

and the overall CID efficiency is the product $$E_{CID} = E_F E_C = \Sigma F_i / P_o$$

The collection efficiency in the quadrupole CID region has been found experimentally to be virtually 100%. There is no detectable loss of ions due to scattering, neutralization, or similar mechanisms at pressures up to $2\times10^{-4}$ torr. The strong focusing nature of the RF-only quadrupole stabilizes the ions after collisions and fragmentation. Preliminary simulation studies show the ion trajectories after collision and fragmentation may contract, but do not get larger. This yields the high collection efficiency we observed experimentally, in contrast to the low efficiency of high energy CID devices. Similar results have been seen for simulated collisions in a three-dimensional quadrupole (R. F. Bonner, R. E. March, *Int. J. Mass Spectrom. Ion Phys.*, vol. 25, pp. 411–432 (1977)).

Fragmentation efficiency in the quadrupole CID system for the compounds studied ranges from 15% for benzene to 65% for n-hexane. This corresponds to fragmentation cross sections of $9\times10^{-16}$ to $1\times10^{-14}$ cm$^2$. At pressures of $2\times10^{-4}$ torr, the mean free path (assuming an ion collision diameter of 5 Å) is approximately equal to the length of the CID quadrupole, 15 cm. The actual ion path length through the CID quadrupole is approximately one-and-a-half times the length of the quadrupole due to the ion's oscillations in the RF field. While transversing 1.5 mean free paths, approximately 87% of the ions experience one or more collisions, 47% two or more, and 26% three or more. In the case of n-hexane, in which 65% of the parent ions are fragmented, 75% of the collisions must lead to fragmentation. This very high efficiency of the low energy CID process is a very clear indication that the low energy collisions do not follow the Massey "adiabatic criterion" (see H. S. W. Massey, E. H. S. Burhop, "Electronic and Ionic Impact Phenomenon", Oxford Univ. Press, London, 1952, p. 513) which gives the limit for the maximum energy transfer in high energy collisions, which limit is far too low to account for the fragmentation observed.

Although the collection efficiency remains nearly 100% under all experimental conditions, the fragmentation efficiency is strongly influenced by changes in experimental variables such as collision gas species and pressure and ion axial energy. Experiments with the triple quadrupole system 26 show that argon as the collision gas produces fragmentation efficiencies three to four times greater than those for hydrogen as the collision gas. At the relatively low energies used in the guadrupole system (5–20 eV), CID may occur through vibrational excitation by momentum transfer (see H. Yamaota, D. Pham, J. Durup, *J. Chem. Phys.*, vol. 51, p. 3465 (1969)). Hence the more massive argon atoms would be expected to be more efficient for low energy CID than hydrogen. At the high energies used in MIKES systems (3–10 keV), CID occurs by vertical electronic excitation followed by relaxation into vibrational excitation (see H. Yamaota et al, above). In this light, it is not surprising that some workers find hydrogen or helium to be most efficient for CID in MIKES systems (see F. W. McLafferty, P. F. Bente III, R. Kornfeld, S. C. Tsai, I. Howe, *J. Am. Chem. Soc.*, vol. 95, pp. 2120–2129 (1973); and K. Levsen, H. Schwarz, *Angew. Chem. Int. Edn.*, vol. 15, pp. 509–519 (1976)). The use of a light collision gas undoubtedly reduces scattering in the field-free drift region used for CID in MIKES systems.

Figure 3:
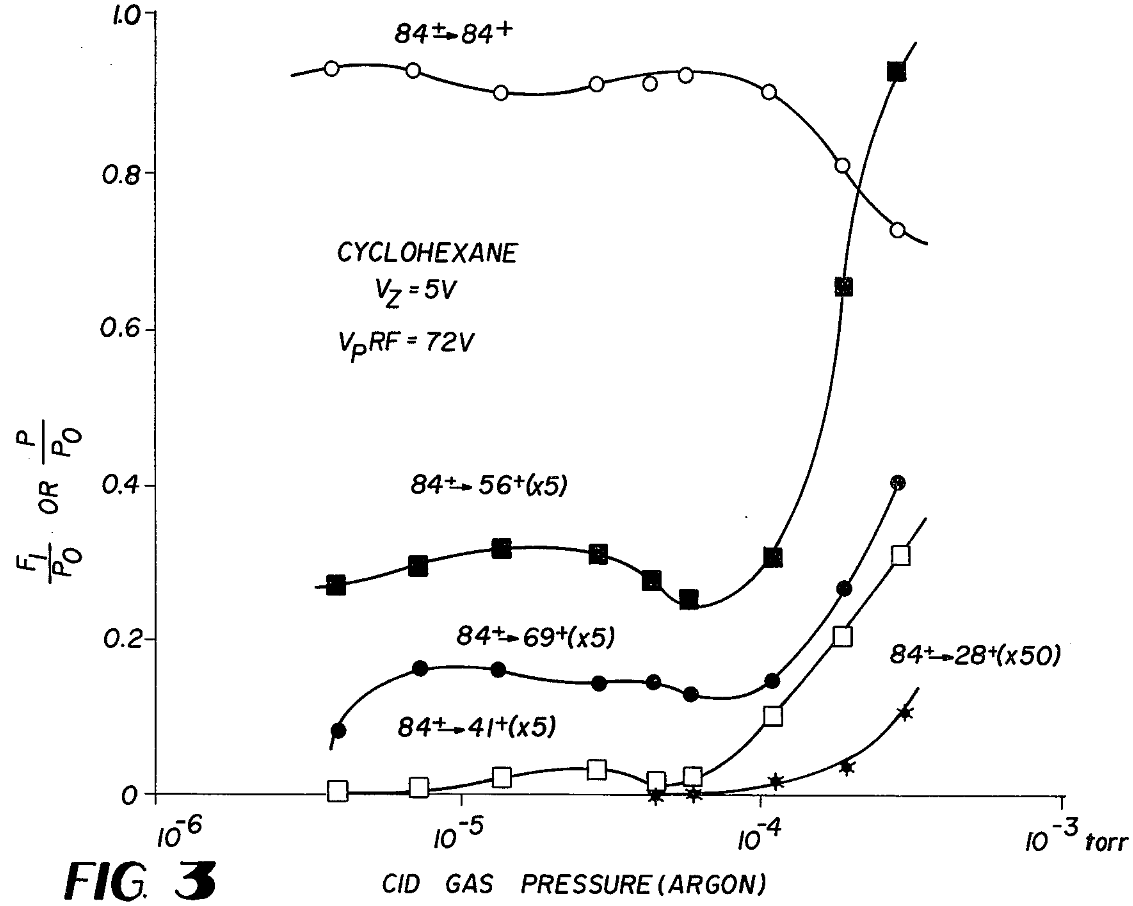
FIG. 3 is a graph showing relative intensity of the parent ion ($P/P_o$) and individual fragment ion ($F_i/P_o$) of a function of CID pressure (argon) for cyclohexane 84+.

Fragmentation efficiency has been found to increase as the CID pressure is increased. FIG. 3 shows the effect of argon collision gas pressure on the intensity of the 84+ parent peak and the individual fragment ions of cyclohexane. As shown, the intensity of all the fragment ions increases dramatically above $10^{-4}$ torr. (Experiments to date have not extended to CID pressures above the $2\times10^{-4}$ torr limit of the particular experimental system.) For a first order dependence of the CID process on collision gas, we would expect plots of $\ln(P/P_o)$ vs. pressure or $\Sigma F_i/P$ vs. pressure to be linear. The quantity and precision of the current data are not sufficient to confirm or refute the hypothesis of a first order fragmentation process.

The axial energy of the ions as they pass through the CID quadrupole has a marked influence on the efficiency of fragmentation. The dependence of fragmentation efficiency on ion axial voltage is shown in the following TABLE II:

TABLE II

Measured Effect of Ion Axial Energy on Fragmentation Efficiency

| Ion Axial Energy | $\frac{\Sigma F_i}{P + \Sigma F_i}$ |
|---|---|
| 0 eV | 0.22 |
| 2.5 eV | 0.19 |
| 5 eV | 0.17 |
| 10 eV | 0.15 |
| 15 eV | 0.45 |

Cyclohexane $84^+$ parent ion.
$2 \times 10^{-4}$ torr argon CID gas.
72 V peak RF in CID stage.
Ion axial energy in mass analyzer quadrupoles, 11 eV.

From TABLE II, it can be seen that fragmentation efficiency exhibits a minimum at an ion axial energy of 10 eV. At higher axial energies, the increased kinetic energy of the ions leads to more energetic collisions and therefore more efficient fragmentation. At ion axial energies below 10 eV, the kinetic energy of the transverse motion of the ions as they oscillate in the RF field (about 5 eV according to the simulations) is the main source of collision energy. Although the collision energy is lower, the lower ion axial velocity increases the number of orbital oscillations the ion undergoes through the quadrupole, and this increased path length results in more collisions. Although it was not initially expected that the fragmentation efficiency would be nearly independent of the RF voltage and frequency, this experimental observation is supported by the simulations in which the ion's transverse velocity (and hence the total path length and ion kinetic energy) is independent of the RF voltage and frequency.

In summary, the overall CID efficiency may be increased by (1) increasing the mass of the collision gas molecules, (2) increasing the CID pressure, (3) optimizing the ion kinetic energy, or (4) possibly by appropriately choosing the collision gas. The efficiency of the CID process is independent, however, of both the frequency and peak RF voltage on the CID quadrupole.

Appearance of CID Spectra

Figure 5:
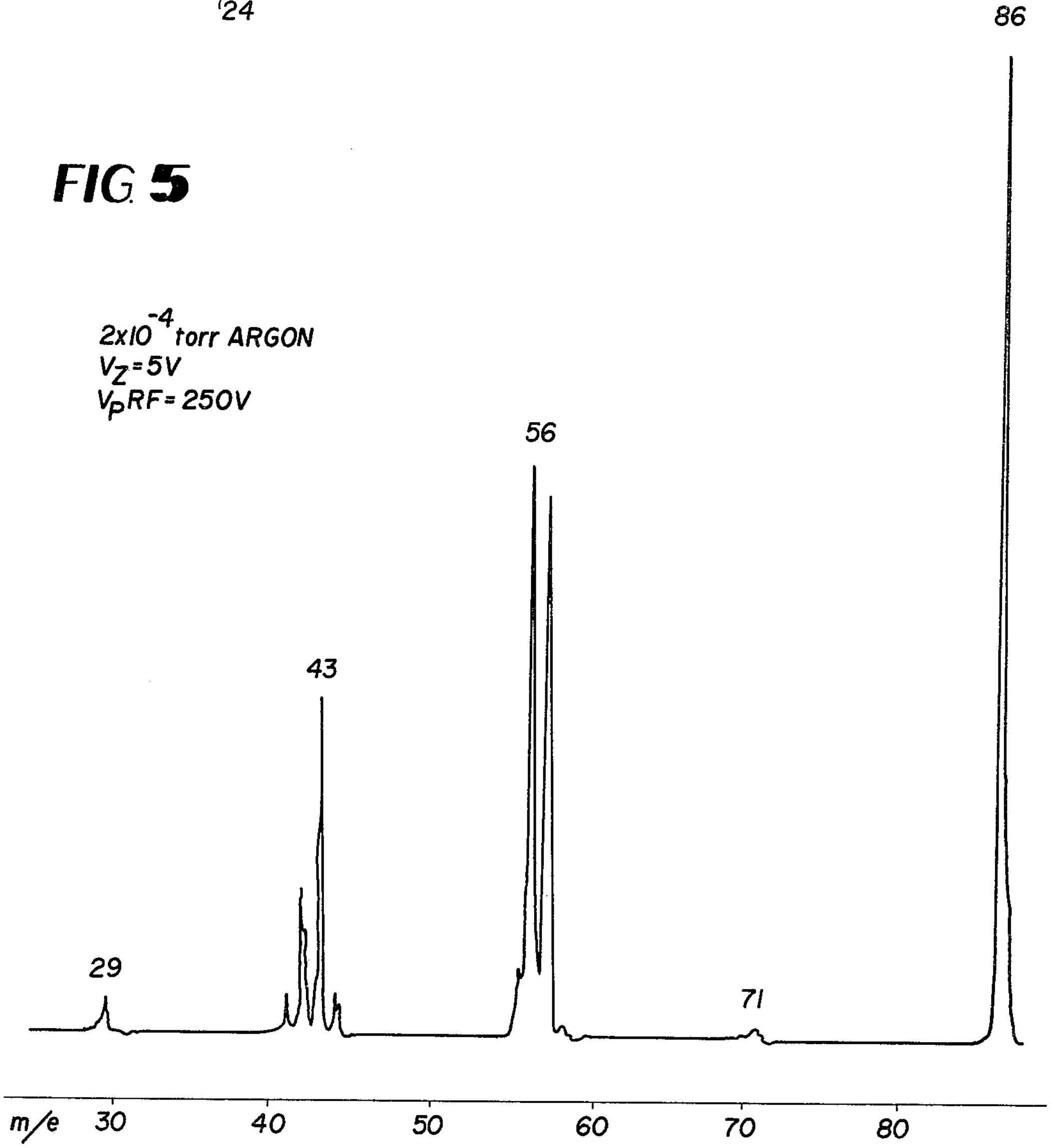
FIG. 5 is a graph showing a CID spectrum of n-hexane 86+.
Figure 4:
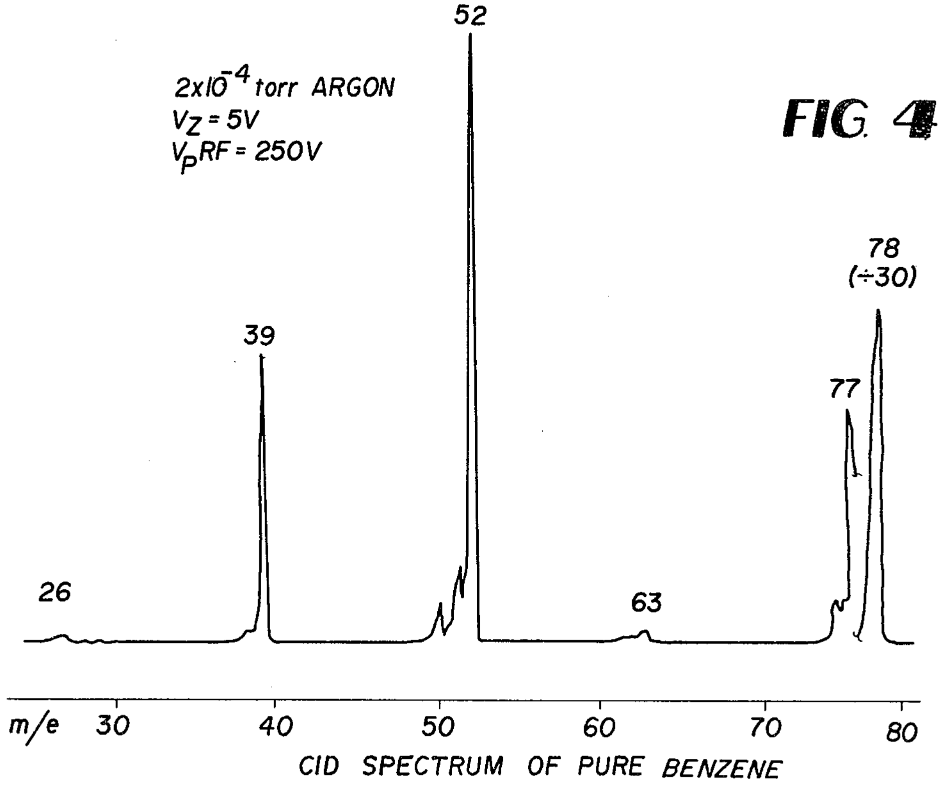
FIG. 4 is a graph showing a CID spectrum of benzene 78+.

A very important factor in assessing the usefulness of CID as a technique for selected ion fragmentation is the appearance of the resulting mass spectra because there is a great body of literature describing known spectra. Examples of the CID spectra obtained are shown in FIGS. 4 and 5 for benzene and n-hexane, respectively. The spectra of benzene and n-hexane demonstrate the characteristic (that is, similar to normal mass spectra for these compounds) and relatively rich spectra seen.

An estimate of the amount of energy involved in fragmentation may be obtained by comparing the CID spectra with electron impact spectra. High energy MIKES CID shows similarities between CID spectra and 50 eV EI spectra (K. R. Jennings, *Int. J. Mass Spectrom. Ion Phys.*, vol. 1, pp. 227–235 (1968)). In the present quadrupole system, however, we observe a very different CID process. The CID spectra obtained resemble 12–20 eV EI spectra, with 14 eV being typical, although differences in the relative abundance of some fragments are apparent.

The abundance of the CID fragment ions can also be compared with the differences between the appearance potentials of the normal ions and the ionization potential of the parent ion. The CID spectra and appearance potential of the corresponding ions for benzene and n-hexane are presented in the following TABLE III:

TABLE III

Comparison of CID Spectra[a] and Ion Appearance Potentials

| m/e | AP-IP (eV)[b] | CID[c] |
|---|---|---|
| Benzene | | |
| 77 | 4.6 | 18 |
| 76 | 5.0 | 3 |
| 52 | 5.3 | 45 |
| 39 | 5.5 | 22 |
| 63 | 6.5 | 11 |
| 50 | 8.3 | 4 |
| 51 | 8.4 | 6 |
| 26 | 9.8 | .3 |
| 27 | 9.9 | .1 |
| n-Hexane | | |
| 71 | 0.8 | .4 |
| 70 | 0.8 | 0 |
| 57 | 0.8 | 30 |
| 56 | 0.8 | 32 |
| 42 | 0.8 | 8 |
| 43 | 1.1 | 19 |

[a] $2 \times 10^{-4}$ torr argon CID gas. Ion axial energy 5 eV. Peak RF voltage 280 V.
[b] Appearance Potential (AP) for normal ion minus Ionization Potential (IP) for molecular (parent) ion. Benzene data from C. Lifshitz, B.G. Reuben, J. Chem. Phys., vol. 50, p. 951 (1969); n-Hexane data from B. Steiner, C.F. Giese, M.G. Inghram, J. Chem. Phys., Vol. 34, p. 189 (1961).
[c] Total fragment ions = 100.

From TABLE III, it can be seen that the intensities $F_i$ of the fragment ions generally show a correlation with the appearance potentials; the greater the appearance potential, the lower the intensity.

The effects of the experimental parameters of the quadrupole CID system on the appearance of the spectra follow closely the effects seen on CID efficiency. Increasing the mass of the collision gas or increasing the ion axial kinetic energy above 10 eV increases the intensity of the ions of higher appearance potentials (that is, increases the electron energy in the corresponding EI spectrum). Increasing either of these variables produces more energetic collisions. Increasing the collision gas pressure, or decreasing the ion axial energy below 10 eV also increases the intensity of ions of higher appearance potentials, since either change increases the number of collisions and the probability of multiple collisions. It would not be expected that the change due to more multiple collisions would be the same as that due to more energetic collisions, but more complete data will be necessary to make that comparison. Neither RF voltage nor frequency have a noticeable effect on the appearance of the CID spectra.

Conclusion

It will be apparent, therefore, that the present invention provides a simple, efficient system for selected ion fragmentation in the form of a triple quadrupole system using CID at low energies in a center RF-only quadrupole. CID in accordance with the invention shows a high fragmentation efficiency (up to 65%), and essentially 100% collection efficiency. The low energy CID process has been shown to be different in several significant respects from the high energy CID process employed in MIKES systems.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A selected ion mass spectrometer for the analysis of unknown samples comprising:

a source capable of ionizing unknown sample molecules of widely varying molecular weights to produce molecular ions, fragment ions, and/or other ions derived from sample components;

first and second mass analyzers in tandem;

means for directing ionized unknown sample molecules, fragments or otherwise derived ions of sample components from said source into said first mass analyzer;

means, interposed between said mass analyzers, for fragmenting and/or reacting, by collision-induced dissociation or reaction, ionized sample molecules, fragments or derivatives selected by said first mass analyzer, the fragmentation and/or reaction being accomplished within a focus device and being induced by unknown sample ions, fragments or components having axial kinetic energies of less than 1 keV colliding with collision gas atoms or molecules; and a detector responsive to the output of said second mass analyzer.

2. A mass spectrometer according to claim 1, wherein said focus device is an electrodynamic focus device.

3. A mass spectrometer according to claim 2, wherein the collision energy level is within the approximate range of 2 eV to 100 eV.

4. A mass spectrometer according to claim 1, wherein the collision energy level is within the approximate range of 2 eV to 100 eV.

5. A selected ion mass spectrometer for the analysis of unknown samples comprising:

a source capable of ionizing unknown sample molecules of widely varying molecular weights to produce molecular ions, fragment ions, and/or other ions derived from the sample components;

first and second analyzers in tandem;

means for directing unknown ionized sample molecules, fragments or otherwise derived ions of sample components from said source into said first mass analyzer;

a low-energy collision-induced dissociation fragmentation/reaction stage interposed between said mass analyzers for receiving selected ionized sample molecules, fragments or components from said first mass analyzer, for fragmenting or reacting the selected ionized sample molecules, fragments or derivatives into ionized further fragments or products, for collecting the ionized further fragments or products, and for directing the ionized further fragments or products into said second mass analyzer, said fragmentation/reaction stage including a collision gas-containing electrodynamic focus device; and a detector responsive to the output of said second mass analyzer.

6. A mass spectrometer according to claim 5, wherein said electrodynamic focus device is a quadrupole-type device.

7. A mass spectrometer according to claim 6, wherein said quadrupole-type device is operated in a broad band filter mode.

8. A quadrupole-based selected ion mass spectrometer for the analysis of unknown samples comprising, in series:

a source capable of ionizing unknown sample molecules of widely varying molecular weights to produce molecular ions, fragment ions, and/or other ions derived from the sample components;

a first quadrupole-type mass analyzer capable of scanning and selecting ionized sample molecules, fragments or derivatives of particular mass over a range of atomic mass units;

a low-energy collision-induced dissociation fragmentation/reaction stage including an electrodynamic focus device, with a collision gas introduced into said electrodynamic focus device, said low-energy fragmentation/reaction stage arranged to receive the selected ionized sample molecules, fragments or derivatives from said first quadrupole-type mass analyzer, and producing ionized further fragments or products of the selected ionized sample molecules, fragments, or derivatives;

a second quadrupole-type mass analyzer capable of scanning over a range of atomic mass units for selecting ionized further fragments or products of particular mass; and a detector at the output of said second quadrupole-type mass analyzer;

whereby the output of said detector may be examined as said first and/or second mass analyzers are scanned to produce a representation of a mass spectrum for identifying the unknown sample and/or components thereof.

9. A mass spectrometer according to claim 8, wherein said electrodynamic focus device is a quadrupole-type device.

10. A mass spectrometer according to claim 9, wherein said quadrupole type device is operated in a broad band filter mode.

11. A mass spectrometer according to claim 8, wherein selected ionized sample molecules received by said low-energy fragmentation stage have ion axial kinetic energies of less than 1 keV.

12. A mass spectrometer according to claim 11, wherein the selected ionized sample molecules have ion axial kinetic energies within the approximate range of 2 eV to 100 eV.

13. A mass spectrometer according to claim 8, wherein the collision gas is argon.

14. A mass spectrometer according to claim 8, wherein the collision gas is specifically chosen to enhance particular features of the fragmentation process.

15. A tandem quadrupole mass spectrometer for selected ion fragmentation studies to analyze unknown samples, comprising:

first, second and third quadrupole-type devices arranged in tandem;

means for operating said first and third quadrupole-type devices in a scanning mass analysis mode over a range of atomic mass units;

means for operating said second quadrupole-type device in a broad-band filter mode;

means for introducing a collision gas into said second quadrupole-type device;

a source capable of ionizing unknown sample molecules of widely varying molecular weights to produce molecular ions, fragment ions, and/or other ions derived from the sample components;

means for injecting molecular ions produced by said source into said first quadrupole-type device at relatively low ion axial kinetic energies; and means for detecting the output of said third quadrupole-type device 16. A quadrupole mass spectrometer according to claim 15, wherein molecular ions selected by said first quadrupole-type device are injected into said second quadrupole-type device for collisions with the atoms or molecules of said collision gas at ion axial kinetic energies of less than 1 keV.

17. A quadrupole mass spectrometer according to claim 16, wherein the selected molecular ions are injected into said second quadrupole-type device at ion axial kinetic energies within the approximate range of 2 eV to 100 eV.

18. An efficient arrangement for fragmenting molecular ions by collision-induced dissociation and collecting the resultant fragments, said arrangement comprising:

an electrodynamic focus device;

a collision gas introduced into said electrodynamic focus device; and means for injecting molecular ions at relatively low ion kinetic energies into one end of said electrodynamic focus device;

fragments or reaction products of the injected molecular ions being produced as a result of collisions with the atoms or molecules of said collision gas, being confined radially within said electrodynamic focus device, and exiting from the other end of said electrodynamic focus device, the collision gas being specifically chosen to enhance particular features of the fragmentation and/or reaction process.

19. A method for analyzing unknown samples by tandem mass spectroscopy, comprising the steps of:

(1) ionizing a quantity of unknown sample to produce molecular ions, fragment ions and/or other ions derived from sample components;

(2) mass scanning the molecular ions, fragment ions and/or derivative ions to select ions of various particular molecular weights at different times during a mass scan;

(3) directing ions selected in step (2) at relatively low ion kinetic energies into an electrodynamic focus device having a collision gas introduced therein, fragment or product ions being produced as a result of collisions between the selected ions and the collision gas atoms or molecules;

(4) mass scanning the fragment or product ions produced in step (3) for each of the various particular weights selected during the step (2) mass scan; and (5) detecting the ions selected in step (4) to produce a representation of a mass spectrum for comparison with reference spectra to identify an unknown sample and/or components thereof.

20. A method according to claim 19, wherein in step (3) ions are directed at axial kinetic energies of less than 1 keV into the electrodynamic focus device.

21. A method according to claim 20, wherein the step (3) ions are directed at axial kinetic energies within the approximate range of 2 eV to 100 eV.

* * * * *

UNITED STATES PATENT AND TRADEMARK OFFICE

CERTIFICATE OF CORRECTION

PATENT NO. : 4,234,791

DATED : November 18, 1980

INVENTOR(S) : Christie G. ENKE; Richard A. YOST; James D. MORRISON

It is certified that error appears in the above-identified patent and that said Letters Patent are hereby corrected as shown below:

In claim 5, column 15, line 58, after "second" insert --mass-- such that the second clause following the preamble reads "first and second mass analyzers in tandem".

In claim 15, column 17, line 22, add a period (.) at the end of the claim.

Signed and Sealed this

*Tenth* Day of *February 1981*

[SEAL]

*Attest:*

RENE D. TEGTMEYER

*Attesting Officer* *Acting Commissioner of Patents and Trademarks*